United States Patent [19]

Wiley, III et al.

[11] 4,420,834

[45] Dec. 13, 1983

[54] FLOW ATTENUATOR FOR USE WITH LIQUID COOLED LASER MIRRORS

[75] Inventors: Walter H. Wiley, III, Palm Beach Gardens, Fla.; John A. Gunn, Norcross, Ga.

[73] Assignee: The United States of America as represented by the Secretary of the Air Force, Washington, D.C.

[21] Appl. No.: 272,441

[22] Filed: Jun. 10, 1981

[51] Int. Cl.³ .............................................. H01S 3/04
[52] U.S. Cl. .................................... 372/35; 138/37; 138/42; 239/555
[58] Field of Search .................... 372/34, 35, 107, 98; 239/555; 138/37, 42

[56] References Cited

U.S. PATENT DOCUMENTS

| | | | |
|---|---|---|---|
| 2,681,255 | 6/1954 | Downey | 299/141 |
| 2,737,857 | 3/1956 | Lee | 138/37 |
| 3,080,885 | 3/1963 | Webster et al. | 137/471 |
| 3,337,134 | 8/1967 | Bond | 239/19 |
| 3,514,074 | 5/1970 | Self | 138/42 |
| 3,628,178 | 12/1971 | Treacy | 331/94.5 |
| 3,781,094 | 12/1973 | Griest | 350/310 |
| 3,921,668 | 11/1975 | Self | 138/42 |
| 3,941,314 | 3/1976 | Moss et al. | 239/553.3 |
| 3,945,124 | 5/1976 | Self | 138/42 |

Primary Examiner—James W. Davie
Assistant Examiner—Leon Scott, Jr.
Attorney, Agent, or Firm—Donald J. Singer; Jacob N. Erlich

[57] ABSTRACT

A flow attenuator which is utilized to direct coolant flow to liquid cooled laser mirrors and in so doing substantially eliminates the liquid flow induced jitter generally associated with such flow. The flow attenuator has a housing in which is formed a centrally located passageway. The passageway branches into a plurality of substantially radially extending contoured chambers. A distribution screen is removably interposed between the passageway and the chambers in order to substantially reduce the "noise" within the coolant liquid as it passes through the attenuator to the laser mirrors.

12 Claims, 6 Drawing Figures

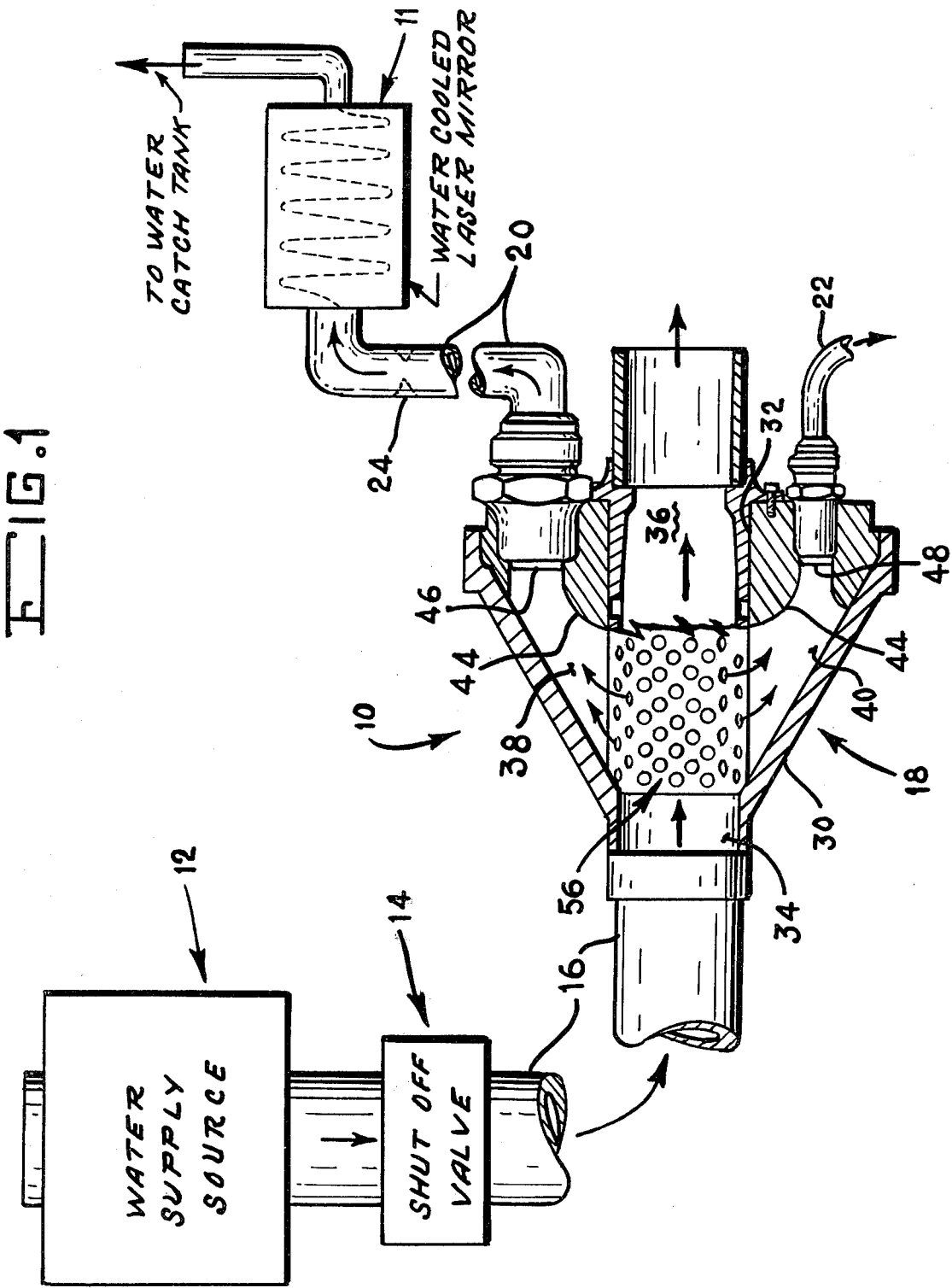

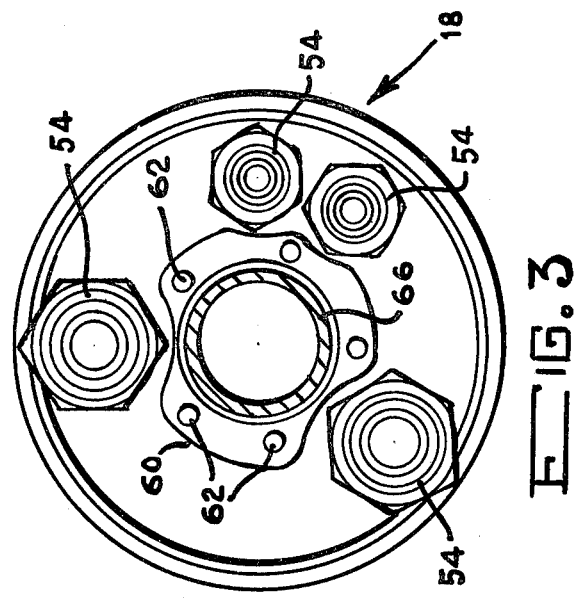
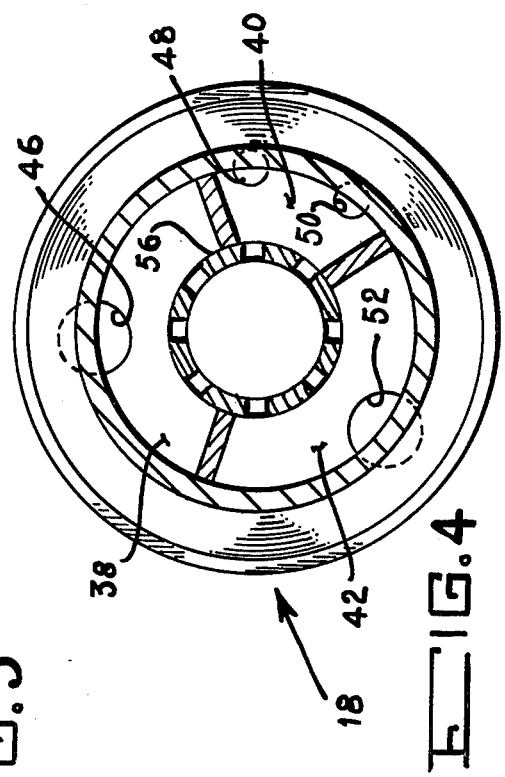
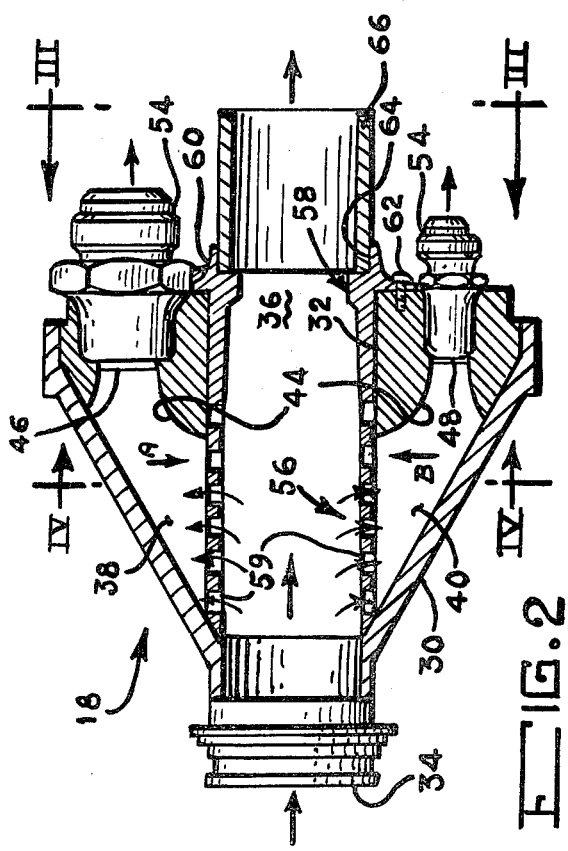
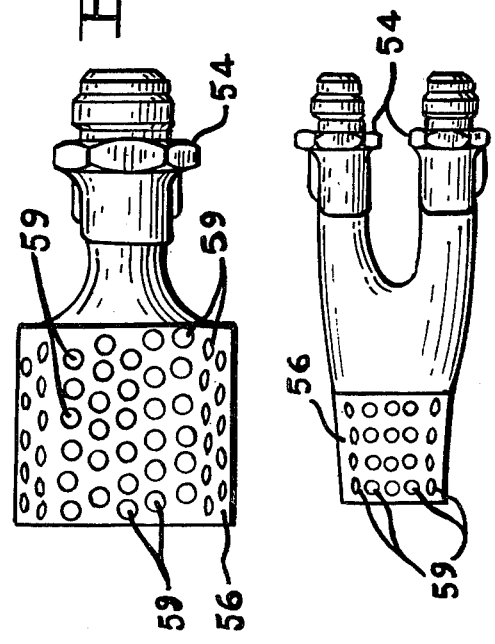

FLOW ATTENUATOR FOR USE WITH LIQUID COOLED LASER MIRRORS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to laser mirrors, and, more particularly to a flow attenuator capable of being used with a liquid cooled mirror in an optical system such as a laser system.

The development of the laser has created a new area of technology which finds application in many systems already in existence today. For example, lasers can be found in the areas of optical communications, holography, medicine, cutting, calculating and in radar. The utilization of the laser in such areas in many instances depends upon the amplification of the existing laser radiation. In order to accomplish such an increase in laser power, it is necessary for the mirrors associated therewith to be cooled in order to accommodate the power.

In certain areas, such as an optical communication or optical radar, it is necessary to greatly amplify the initial radiation power produced by the laser. In many instances, such an amplification proved to be highly impractical since the existing mirrors for high power lasers were insufficiently cooled. Since the optical figure of the mirror must be maintained, highly specialized structures are necessary to combine efficient cooling with stable support of the reflecting surface.

An effective laser mirror cooling system has been characterized by the utilization of liquid cooled laser mirrors. Generally, the the liquid coolant for the laser mirrors is water which is distributed from a tank through a control valve, distribution fitting, and orifice to control pressure and flow. Unfortunately, siginificant mirror jitter has been attributed to "noise" in the water supply system, and particularly to flow vibration induced by conventional distribution and orifice methods. The water flow induced jitter not only acts directly on each individual optical element of the laser system, but even more significantly the resonant response of individual optical elements of the system transmits significant bench-borne vibration to other optical elements of the system. Consequently, it is of utmost importance in high power laser systems, in particular, to prevent such water flow induced jitter from detracting from the overall efficiency of the laser system.

SUMMARY OF THE INVENTION

The flow attenuator of this invention finds its main applicability, although not limited thereto, in use within a high power laser system and overcomes the problems set forth in detail hereinabove by substantially eliminating the water flow induced jitter associated with water cooled laser mirrors of the past. Consequently, the detrimental effects of such jitter on the entire laser system are substantially eliminated.

In this invention a flow attenuator is placed within liquid or water flow line which leads to the laser mirrors. The attenuator is formed of a funnel or cone-shaped housing having a central passageway. A removable distribution screen is located within the passageway and permits the passage therethrough of the coolant into a plurality of contoured distribution plenums or chambers. The chambers discharge the required flow to the appropriate laser mirrors or apertures.

Openings of appropriate size and number in the distribution screen are arranged to provide uniform flow distribution into the plurality of plenums or chambers in order to minimize down stream disturbances in the main flow direction. In addition, since the screen is removable a variety of screens having differently sized openings and number of openings can be utilized with this invention. As a result of utilizing the flow attenuator of this invention, water flow induced vibration jitter is substantially eliminated in a simple mechanical arrangement having adequate structural features for utilization under high pressure application as, for example, in a high power laser system.

It is therefore an object of this invention to provide a flow attenuator for use with liquid cooled laser mirrors which is capable of substantially eliminating liquid flow induced jitter within the optical elements of the laser system.

It is another object of this invention to provide a flow attenuator for liquid cooled laser mirrors in which a plurality of distribution screens having differently numbered and sized openings can be utilized within the attenuator.

It is a further object of this invention to provide a flow attenuator for use with liquid cooled laser mirrors which is capable of reliable operation under high pressure conditions.

It is still a further object of this invention to provide a flow attenuator for liquid cooled laser mirrors which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a schematic representation of a laser system which includes therein a liquid cooled laser mirror and in which the flow attenuator of this invention is shown partly in cross section;

FIG. 2 is a side elevational view of the flow attenuator of this invention shown partly in cross section;

FIG. 3 is a front view of the flow attenuator of this invention taken along line III—III of FIG. 2;

FIG. 4 is a cross sectional view of the flow attenuator of this invention taken along line IV—IV of FIG. 2;

FIG. 5 is a pictorial representation showing a partially unwrapped view of a plenum or chamber including the distribution screen of the flow attenuator of this invention taken in the direction of arrow A of FIG. 2; and FIG. 6 is a pictorial representation of the other plenums or chambers including the distribution screen of the attenuator of this invention taken in the direction of arrow B of FIG. 2.

DETAILED DESCRIPTION OF THE PREFERRED EMBODIMENT

For a clearer understanding of this invention it is first necessary to refer to FIG. 1 of the drawing which sets forth in schematic fashion a typical laser system 10 which incorporates therein a plurality of conventional liquid or water cooled laser mirrors (only one of which is shown as mirror 11), a suitable supply of liquid coolant for laser mirror 11 in the form of, for example, a water supply source 12, a conventional shutoff valve 14, a coolant supply line 16, the flow attenuator 18 of this invention illustrated in cross section, and a plurality of distribution lines 20 and 22 which includes in some instances a flow control orifice 24. The liquid coolant, which in this instance is preferably water, is passed through flow attenuator 18 for distribution by lines 20 and 22 to any conventional liquid or water cooled laser mirror 11.

The detailed description of flow attenuator 18 of this invention is best shown in FIGS. 2 through 6 of the drawing. Although the following description will be taken mainly in conjunction with FIGS. 2 through 6 of the drawing, it should be noted that frequent reference will be given to FIG. 1 which clearly illustrates the operative relationship of flow attenuator 18 with the other elements of a conventional laser system 10 which includes liquid cooled laser mirror 11.

As clearly depicted in FIG. 2 of the drawing, flow attenuator 18 is formed of a funnel or cone-shaped housing 30 having a centrally located longitudinally extending passageway 32 illustrated as being open at both ends 34 and 36 thereof. It should be noted, however, that although both ends 34 and 36 are shown open ended, in some instances it may be desirable to cap end 36 (not shown).

Passageway 32 branches into a plurality of substantially radially extending flow distribution plenums or chambers 38, 40 and 42 best illustrated in FIGS. 2 and 4 of the drawing. As part of the inventive concept, plenums or chambers 38, 40 and 42 are formed with conically shaped entrances or inlets 44 so as to provide a smooth transition of flow from passageway 32 into plenums 38, 40 and 42 and from there to the individual distribution lines depicted in FIG. 1 of the drawing as lines 20 and 22. The exact number of lines may vary within the confines of this invention, however, each outlet 46, 48, 50 and 52 best shown in FIG. 4 is associated with a different distribution line respectively (only lines 20 and 22 being shown in the drawing).

Additionally, the number of outlets associated with each chamber may vary. In the embodiment described hereinabove chambers 38 and 42 have one outlet (46 and 52, respectively) associated therewith, while chamber 40 has two outlets (48 and 50) associated therewith. Each outlet 46, 48, 50 and 52 of respective plenums or chambers 38, 40 and 42 incorporates therein a conventional fitting 54 for the connection of the respective distribution lines thereto.

Still referring to FIG. 2 of the drawing, located in the central passageway 32 of housing 30 of attenuator 18 of this invention is a cylindrically-shaped distribution screen 56. Distribution screen 56 may be formed as an integral part of a sleeve 58 which is removably positioned within passageway 32. In this manner screen 56 can be slid into passageway 32 and fixedly secured in place. The positioning of screen 56 in place is accomplished by means of a circumferential flange 60 formed on the outer edge of sleeve 58. Flange 60 is fixedly secured to housing 30 by conventional securing means in the form of bolts 62. The internal configuration of flange 60 includes a lip 64 which enables either another distribution line 66 as illustrated in FIG. 2 or a cap (not shown) to be fixedly attached thereto by, for example, a press fit or brazing.

Distribution screen 56 has a substantial number of holes or openings 59 of small diameter therein, sized to provide a minimum pressure drop across the screen and reduce the flow velocity to the plenums or chambers 38, 40 and 42. By making screen 56 removable, variations in the size, number and hole pattern, is possible. A typical distribution screen 56 may include approximately 288 holes being spaced apart 15° radially at approximately 0.25 inches between holes axially. Each hole 59 may be in the order of 0.125 inches in diameter.

Since turbulent flow is characterized by small, high frequency velocity fluctuations superimposed on the mean motion of the fluid flow, individual fluid particles exhibit a totally random motion. The utilization of distribution screen 56 within the flow attenuator 18 of this invention acts to force a uniform velocity profile as the liquid such as water exits screen 56. At the same time, the flow velocity will be reduced due to the increased flow area in each of the chambers 38, 40, and 42. The net effect is a less violent flow prior to distribution into the individual distribution lines 20 and 22.

The effect of utilizing distribution screen 56 also applies to pressure perturbations as well. Consequently, liquid or water flow to the liquid cooled mirror 11 as illustrated in FIG. 1 of the drawing by the use of flow attenuator 18 of this invention is void of the water flow induced jitter previously associated with liquid or water cooled laser mirrors.

Although this invention has been described with reference to a particular embodiment it will be understood to those skilled in the art that this invention is also capable of a variety of alternate embodiments within the spirit and scope of the appended claims.

We claim:

1. In a laser system having at least one liquid cooled laser mirror, a liquid coolant supply source and a supply line to feed said liquid coolant to said laser mirror, the improvement comprising a flow attenuator operably connected to said supply line, said flow attenuator comprising a housing, said housing being open at one end thereof, said open end being connected to said supply line, a centrally located passageway extending longitudinally from said open end, at least one chamber extending from said passageway, said chamber having an entrance opening at one end thereof connected to said passageway, said chamber having an exit opening at the other end thereof connected to said liquid cooled mirror, and a distribution screen having a plurality of openings therein being secured within said passageway adjacent said entrance opening of said chamber whereby liquid flow induced jitter in said laser mirror is substantially eliminated as said coolant flows from said supply source to said laser mirror.

2. In a laser system as defined in claim 1 wherein said chamber has a conically-shaped portion adjacent said entrance opening providing a smooth transition of flow into said chamber from said passageway.

3. In a laser system as defined in claim 2 wherein said chamber extends substantially radially from said passageway.

4. In a laser system as defined in claim 1 wherein said distribution screen is formed as part of a cylindrically-shaped sleeve which is capable of being slid into position within said passageway.

5. In a laser system was defined in claim 4 wherein said sleeve has a circumferential flange formed on one end thereof, said flange being positioned adjacent said housing when said screen is in operative position adjacent said entrance opening of said chamber, and removable means interconnected between said flange and said housing for securing said screen in place.

6. In a laser system as defined in claim 5 wherein there are three chambers extending substantially radially from said passageway, each of said chambers having an entrance opening at one end thereof connected to said passageway and an exit opening at the other end thereof.

7. A flow attenuator for substantially eliminating flow induced jitter comprising: a housing, said housing being open at one end thereof, a centrally located passageway extending longitudinally from said open end, at least one chamber extending from said passageway, said chamber having an entrance opening at one end thereof connected to said passageway and having a conically-shaped portion adjacent said entrance opening thereby providing for a smooth transition of flow into said chamber from said passageway, said chamber having an exit opening at the other end thereof, and a distribution screen having a plurality of openings therein secured within said passageway adjacent said entrance opening of said chamber.

8. A flow attenuator as defined in claim 7 wherein said chamber extends substantially radially from said passageway.

9. A flow attenuator as defined in claim 8 wherein said distribution screen is formed as part of a cylindrically-shaped sleeve which is capable of being slid into position within said passageway.

10. A flow attenuator as defined in claim 9 wherein said sleeve has a circumferential flange formed on one end thereof, said flange being positioned adjacent said housing when said screen is in operative position adjacent said entrance opening of said chamber, and removable means interconnected between said flange and said housing for securing said screen in place.

11. A flow attenuator as defined in claim 10 wherein there are three chambers extending substantially radially from said passageway, each of said chambers having an entrance opening at one end thereof connected to said passageway and an exit opening at the other end thereof.

12. A flow attenuator as defined in claim 11 wherein said passageway is also open at the other end thereof.

* * * * *